INVENTOR.
Paul J. Long, Jr.
BY C. R. Meland
His Attorney

United States Patent Office 3,157,396
Patented Nov. 17, 1964

---

3,157,396
SHOCK ABSORBER AND AIR SPRING DEVICE
Paul J. Long, Jr., Dayton, Ohio, assignor to General Motors Corporation, Detroit, Mich., a corporation of Delaware
Filed May 17, 1963, Ser. No. 281,103
4 Claims. (Cl. 267—64)

This invention relates to a vehicular suspension system incorporating a combination shock absorber and supplementary air spring unit.

The shock absorber and air spring arrangement described in the present invention is similar to the arrangement described in Patent No. 3,063,702 assigned to the assignee of the present invention. In an arrangement such as this, a problem arises due to the environment in which the suspension system of a vehicle operates. Road dirt and other extraneous foreign matter normally attaches itself to the operating parts of the suspension system during their operation. In an air spring of the type described, the flexible wall portion, in peeling itself back along the outer wall of the shock absorber, exposes a portion of the wall to this environment and, after sustained operations, foreign matter will collect on this wall and will impede peeling action of the flexible wall. In some cases, the condition may result in serious complications, such as rupture of the flexible wall.

It is an object of the present invention to provide a method of keeping this area free of any substantial build-up of foreign material.

It is a further object of this invention to provide a shock absorber that works in conjunction with an air spring, the shock absorber having a resilient covering in the area that is exposed as the resilient portion of the air spring wall is peeled back.

It is still a further object of this invention to allow the resilient wall portion of the air spring to purge the exposed surface of the shock absorber by the squeezing action generated in this resilient wall portion as the air spring returns to its fully retracted position.

Further objects and advantages of the present invention will be apparent from the following description, reference being had to the accompanying drawings wherein a preferred form of the invention is clearly shown.

Figures 1, 2:
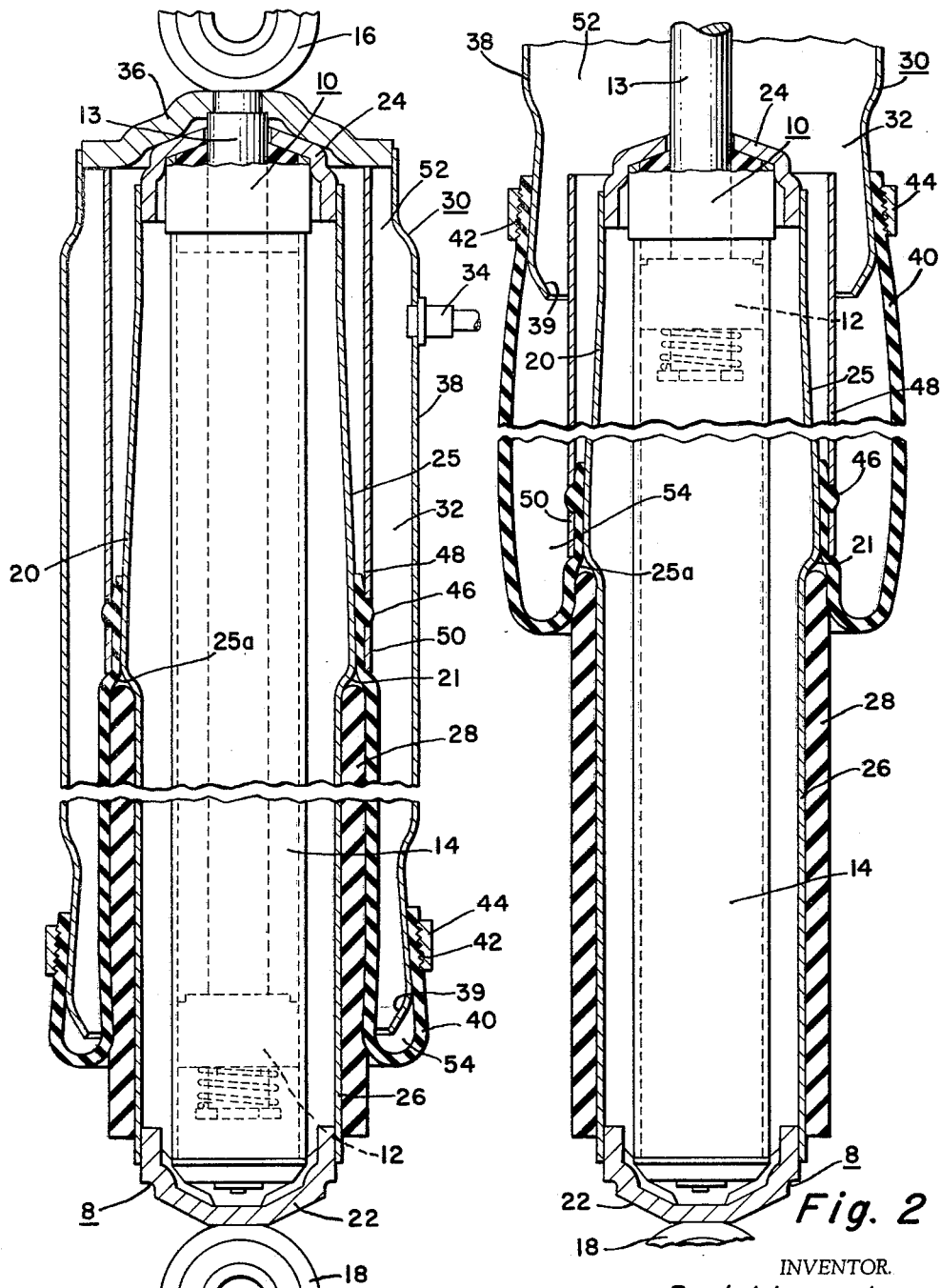
FIGURE 1 is a longitudinal, cross sectional view of a combination shock absorber and supplementary air spring unit showing the air spring in the fully retracted position.
FIGURE 2 is a longitudinal, cross sectional view of a combination shock absorber and supplementary air spring unit with the air spring shown in a fully extended position.

Referring now to the drawings, FIGURE 1 shows a combination shock absorber and air spring unit 8 with its air spring 30 in the fully retracted position. The shock absorber 10 is attached to the sprung mass of the vehicle, not shown, by means of the fitting 16 and is attached to the unsprung mass of the vehicle, not shown, by means of the fitting 18. The piston 12 reciprocates in the compartment 14 in response to relative movement between the sprung and the unsprung mass. The operative parts of the shock absorber 10 are enclosed by a wall 20 which is of cylindrical shape, said wall being enclosed on one end by the closure cap 22 and on the other end by a closure cap 24. The wall 20 has a portion extending towards the closure cap 24 in the shape of a truncated cone 25. At approximately the center of the shock absorber 10 and along wall 20, there is an inturned portion 21 that leads into an elongated depressed portion 26. A sleeve of elastomeric material 28 is disposed in and substantially fills the elongated depressed portion 26. This sleeve of resilient, elastomeric material is of a slightly smaller inside diameter than the depressed portion 26 and, when mounted, is caused thereby to be held in firm attachment to this wall portion. The outside diameter of this sleeve of resilient material is slightly greater than the diameter of the shock absorber wall at point 25a. It is understood that the outer diameter of the sleeve 28 is greater than the inside diameter of a resilient wall portion 30 and as mounted serves to stretch the resilient wall portion 30. At the point of initial contact this creates an interference therebetween. This interference is most obvious at point 25a as illustrated in FIGURE 2. It is understood further that a similar interference point will be set up anywhere along the periphery of the sleeve 28 as the resilient wall portion 40 changes direction in its rolling movement along the sleeve 28. To better illustrate, the change of direction of rolling of the wall portion 40 occurs when the vehicle weight settles back on the shock absorber air spring arrangement after the shock absorber has been extended. As this occurs a surge of air pressure is created within a pressurized compartment 32 and drives the leading edge of the rolling wall portion 40 more deeply into the sleeve 28 in its movement thereacross. Thereafter progressive axial deformation of the sleeve 28 takes place which compresses and flexes the outer surface of the sleeve 28 causing encrustations to become dislodged in a manner to be hereinafter described.

The air spring, generally designated by numeral 30, actuates a rolling elastomeric diaphragm or resilient wall portion 40 which is circumferentially mounted on the shock absorber 10. The air spring constitutes a pressurized compartment 32 that serves to assist the springs, not shown, located between the sprung and the unsprung masses, in the support of the vehicle weight. The pressurized compartment 32 includes a valve inlet 34 fitted with a valve, not shown, through which an appropriate fluid, such as air, may be supplied. The pressurized compartment 32 is composed substantially of a rigid shell portion 38 enclosed on one end by the air spring cap 36, said rigid shell portion 38 having a resilient wall portion 40. The resilient wall portion 40 is kept in firm engagement with the rigid shell portion 38 by the pressure exerted on the resilient wall portion 40 by a metal band 44 and by the action of the serrations 42. The resilient wall portion 40 is attached at the other end to the wall 20 near the point of the greatest diameter of the wall portion 25a consisting of the truncated cone 25 immediately adjacent to the inturned portion of the wall 21. The resilient wall portion 40 is prevented from moving in one direction by the action of a lip 46 against the band 50 holding it in firm engagement with the truncated conical wall portion 25. The resilient wall portion 40 is prevented from moving in the opposite direction by the pressure exerted on the lip 46 by the internal metal cylinder 48 which serves both to hold the resilient wall portion 40 in position and to provide a guide, during operation of the air spring, for the internal flange guide 39. The air spring cap 36 is held firmly between the shaft 13 and the fitting 16 so that any movement in the piston 12 will be carried on into the air spring cap 36; it being an integral part of the pressurized compartment 32, the whole air spring assembly will move in the same direction as the piston 12 moves.

In operation, the shock absorber and air spring assembly 8 is mounted on a vehicle by the fitting 16 being attached to the sprung mass of the vehicle and the fitting 18 being attached to the unsprung mass. The shock absorber 10 will operate in the conventional manner. The air spring 30 will operate as a supplement to the normal springs in the suspension system in that, as the compartment 32 is pressurized, force will be exerted on the bottom end of the air spring cap 36 which tends to pull the piston 12 towards the fitting 16, independent of the hydraulic pressure on the force side of the piston 12. Thus, it is seen that pressurizing the compartment 32 will tend to change the extension of the shaft 13 from the shock absorber body.

In a typical operating situation, the unsprung portion of the vehicle will be caused to vary the distance from the sprung portion due to the relative attachment of the fitting 16 and the fitting 18 so that the shaft 13 will extend from the shock absorber. As this occurs, the presurized compartment will change in shape due to the movement of the air spring cap 36 in the direction of the sprung portion until the air spring attains a position as illustrated in FIGURE 2. This movement will cause the resilient wall portion 40 to expose all or portions of the sleeve of resilient material 28 to the outside environment. During this exposure, it is natural, due to splash, that foreign material, such as mud, will be deposited on the sleeve 28. When dry, this mud becomes encrusted and hard and, upon movement of the wall portion 40 along the resilient sleeve 28, it will be cracked and ruptured and drop off the sleeve. This action occurs due to the resiliency of the elastomeric wall portion 28 which is compressed and flexed by the rolling or peeling movement therealong of the pressurized resilient wall portion 40.

In normal operation, as the vehicle passes over a roadway, the cycle hereinbefore described occurs very rapidly and, therefore, causes a very frequent and rapid flexing of the sleeve of resilient material 28 and the resilient wall portion 40, thus perpetuating the purging action. It is apparent that, as the pressure in the pressurized compartment 32 is increased, the purging action will be magnified and, thus, under heavy load conditions when the extensions are most likely to occur, the purging action of the two resilient surfaces will be at its most efficient level.

It is to be understood that the invention as described in an automotive suspension system is used by way of example and not of limitation and that the invention could be practiced equally as well on any hydraulic cylinder and air spring arrangement where the environment is such as to cause the likelihood of pickup of foreign material.

While the embodiment of the present invention, as hereby disclosed, constitutes a preferred form, it is to be understood that other forms or designs might be adopted.

What is claimed is as follows:

1. In an automobile suspension system, the combination of a tubular type shock absorber and an air spring means, said tubular type shock absorber having a main wall and a wall portion of a lesser diameter than the main wall and a sleeve of elastomeric material disposed in said lesser diameter wall portion, and being of sufficient thickness to fill the lesser diameter wall portion and bring the overall outside diameter in this area to a dimension greater than the main wall portion, said air spring arrangement including a cap, a resilient wall portion and a cylindrical metallic portion firmly attached to said resilient wall portion on one end and to the cap on the other end forming a pressurizing chamber around the outer wall of the tubular type shock absorber, said resilient wall portion of the air spring being of a slightly smaller diameter than the tubular main wall to cause a biased attachment thereto, said resilient wall portion of the air spring means being adapted to suddenly deform and progressively roll to continue the deformation on the sleeve of elastomeric material of the shock absorber during operation of said combination thereby causing a flexing of the sleeve of elastomeric material which expels any accumulation of foregin matter from the resilient wall portion.

2. In an automotive suspension system, the combination of a shock absorber of a reciprocating type and an air spring circumferentially mounted on said shock absorber, said shock absorber having an outer wall with a depressed area and a sleeve of elastomeric material of a greater thickness than the depth of the depressed area disposed in the depressed area, said air spring comprising a pressurized compartment formed by a cap, a metal shell disposed around said shock absorber attached to said cap, and a resilient cylindrical wall portion attached on one end to the metal shell and on the other end to the shock absorber outer wall at a point adjacent to the depressed area, said resilient cylindrical wall portion being of sufficient length to provide a flexible enclosure and being disposed to roll back on itself in a peeling movement during one motion in the reciprocation of said shock absorber, said peeling movement exposing the sleeve of elastomeric material in the depressed area to foreign matter and during the return motion of the reciprocation of the shock absorber forcibly depressing the band of resilient material and continually deforming the band of resilient material thereby breaking the foreign matter free from the band of resilient material that can become attached thereto during its exposure.

3. In a suspension system between a sprung and an unsprung mass, the combination of a tubular shock absorber of the reciprocating type and an air spring means circumferentially mounted on said shock absorber providing a yieldable connection between said sprung and unsprung masses, said shock absorber having an outer wall of a cylindrical shape with a depressed portion on one end generally corresponding to the amount of reciprocating movement thereof, a sleeve of elastomeric material of a greater thickness than the depth of the depressed portion disposed in said depression, and a cylinder end cap closing one end of said outer wall, said air spring means comprising a pressurize compartment formed by a cap, a metal shell with an inturned end flange guide disposed around said shock absorber attached on one end to said cap, and a resilient cylindrical wall portion contiguous to said elastomeric sleeve and firmly engaging another end of the metal shell and kept in firm engagement with the shock absorber outer wall by its own resiliency plus engagement with an internal metal cylinder at a point adjacent to the depressed portion, said internal metal cylinder cooperating with the internal end flange guide for directional control during cylinder reciprocation, said resilient cylindrical wall portion being of sufficient length to provide a flexible enclosure and being disposed to roll back on itself in a peeling-like movement during one motion in the reciprocation of said shock absorber thereby exposing the sleeve of elastomeric material in the depressed portion to foreign matter, and said foreign matter being expelled by the cooperative action of the elastomeric sleeve in the depressed portion and the contiguous resilient cylindrical wall portion during the return motion of the reciprocation of the shock absorber, the cooperative action of the elastomeric sleeve in the depressed portion and the contiguous resilient cylindrical wall portion being an abruptly formed depression and a progressive deformation of the wall portion of a magnitude sufficient to force the foreign matter from the surface of the wall portion by the abrasive action therebetween.

4. In an automotive suspension system, the combination of a shock absorber of a reciprocating type and an air spring circumferentially mounted on said shock absorber, said shock absorber having an outer wall with a depressed area and a sleeve of substantially unconfined elastomeric material of a greater thickness than the depth of the depressed area disposed in the depressed area, said air spring comprising a pressurized compartment formed by a cap, a metal shell disposed around said shock absorber attached to said cap, and a resilient cylindrical wall portion attached on one end to the metal shell and on the other end to the shock absorber outer wall at a point adjacent to the depressed area, said resilient cylindrical wall portion having an inside diameter larger than the outer diameter of the sleeve and being of sufficient length to provide a flexible enclosure therefor, said wall portion being disposed to roll back on itself in a peeling movement during one motion in the reciprocation of said shock absorber, said peeling movement exposing the sleeve of elastomeric material in the depressed area to foreign matter and during the return motion of the reciprocation of the shock absorber expelling any foreign matter becoming disposed on said band of resilient material during its exposure by the intereference of the large diameter elastomeric sleeve and said smaller diameter resilient wall portion, said sleeve of elastomeric material being sufficiently resilient to allow progressive free axial deformation of the sleeve during coaction with the resilient wall portion for progressively removing encrusted foreign matter therefrom.

References Cited in the file of this patent
UNITED STATES PATENTS

| | | |
|---|---|---|
| 2,988,353 | Dietrich | June 13, 1961 |
| 3,063,701 | Long | Nov. 13, 1962 |